United States Patent
Tsujimoto

(10) Patent No.: US 7,283,732 B2
(45) Date of Patent: Oct. 16, 2007

(54) OPTICAL DISK REPRODUCING DEVICE

(75) Inventor: Satoshi Tsujimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1199 days.

(21) Appl. No.: 10/243,721

(22) Filed: Sep. 16, 2002

(65) Prior Publication Data

US 2003/0053382 A1    Mar. 20, 2003

(30) Foreign Application Priority Data

Sep. 17, 2001    (JP)    ............ P2001-280914

(51) Int. Cl.
*H04N 5/00*    (2006.01)
(52) U.S. Cl. ............................ 386/126
(58) Field of Classification Search .......... 386/46, 386/82, 83, 124–126
See application file for complete search history.

(56) References Cited

U.S. PATENT DOCUMENTS 5,999,698 A * 12/1999 Nakai et al. ............... 386/125
6,553,180 B1 * 4/2003 Kikuchi et al. ............ 386/95

FOREIGN PATENT DOCUMENTS

| JP | 10-125049 | 5/1998 |
| JP | 2000-156023 | 6/2000 |
| JP | 2002-56654 | 2/2002 |
| JP | 2002-74913 | 3/2002 |
| JP | 2002-352567 | 12/2002 |

* cited by examiner

*Primary Examiner*—Thai Q. Tran
*Assistant Examiner*—Mishawn Dunn
(74) *Attorney, Agent, or Firm*—Morgan, Lewis & Bockius LLP

(57) ABSTRACT

In an optical disk reproducing device for reproducing the video/audio information recorded on an optical disk wherein a setup menu is displayed for setting various kinds of functions of the optical disk reproducing device and a function is selected from the displayed setup menu, assuming that an instantaneous reproduction has been selected by the selecting means, when the optical disk is loaded in the optical disk reproducing device to reproduce the video/audio information, without an opening screen and a menu screen set for the optical disk being displayed, the video/audio information is reproduced from a first chapter included in a first title of the video/audio information recorded on the optical disk.

5 Claims, 4 Drawing Sheets

OPTICAL DISK REPRODUCING DEVICE

BACKGROUND OF THE INVENTION

1. Field of the Invention

This invention relates to an optical disk reproducing device for reproducing the video/audio information recorded on an optical disk such as a DVD (digital video disk), and more particularly to an optical disk reproducing device having a function of instantaneously reproducing main video/audio information without displaying an opening screen and a menu screen set for the optical disk.

2. Description of the Related Art

In a conventional technique as disclosed in JP-A-125049, i.e. in an optical disk reproducing device in which a menu composed of track numbers of an optical disk with video/audio information recorded and titles representative of the contents of the video/audio information is displayed and a desired track number is selected from the displayed menu to reproduce the video/audio information corresponding to the selected track number, prescribed segments corresponding to a plurality of track numbers in the menu are successively reproduced and during successive reproduction of the prescribed segments, when "continuous reproduction" is selected by an operation of a selecting key, the successive reproduction of the prescribed segments is stopped and the video/audio information corresponding to the track during the successive reproduction of the prescribed segments is continuously reproduced so that the track number with desired video/audio information recorded thereon can be selected without seeing the menu screen.

In the conventional technique as described above, without seeing the menu screen, prescribed segments corresponding to a plurality of track numbers in the menu can be successively reproduced and during successive reproduction of the prescribed segments, when "continuous reproduction" is selected by an operation of a selecting key, the successive reproduction of the prescribed segments can be stopped and the video/audio information corresponding to the track during the successive reproduction of the prescribed segments can be continuously reproduced. However, the main video/audio information cannot be instantaneously reproduced without the opening screen and the menu screen set for the optical disk being displayed, from the first chapter included in the first title of the video/audio information recorded on the optical disk.

SUMMARY OF THE INVENTION

This invention has been accomplished in view of the above points as described above, and intends that when the optical disk is loaded in an optical disk reproducing device to reproduce the video/audio information recorded on an optical disk, without an opening screen and a menu screen set for the optical disk being displayed, the video/audio information recorded on the optical disk can be reproduced from a first chapter included in a first title of the video/audio information recorded on the optical disk.

In order to attain the above object, there is provided an optical disk reproducing device for reproducing video/audio information recorded on an optical disk comprising:

a display means for displaying a setup menu for setting various kinds of functions of the optical disk reproducing device;

a selecting means for selecting a function from the setup menu displayed by the display means; and a reproducing means for reproducing the video/audio information recorded on the optical disk on the basis of the function selected by the selecting means, wherein assuming that "instantaneous reproduction" has been selected by the selecting means, when the optical disk is loaded in the optical disk reproducing device to reproduce the video/audio information, without an opening screen and a menu screen set for the optical disk being displayed, the video/audio information is reproduced from a first chapter included in a first title of the video/audio information recorded on the optical disk.

Assuming that the "instantaneous reproduction" has not been selected by the selecting means, when the optical disk is loaded in the optical disk reproducing device to reproduce the video/audio information, the opening screen and the menu screen set for the optical disk are displayed and the video/audio information recorded on the optical disk is normally reproduced.

By means of these means, when the optical disk is loaded in the optical disk reproducing device to reproduce the video/audio information recorded on the optical disk, without the opening screen and a menu screen set for the optical disk being displayed, the main video/audio information can be instantaneously reproduced from a first chapter included in a first title of the video/audio information recorded on the optical disk.

DETAILED DESCRIPTION OF THE PREFERRED EMBODIMENTS

Figure 1:
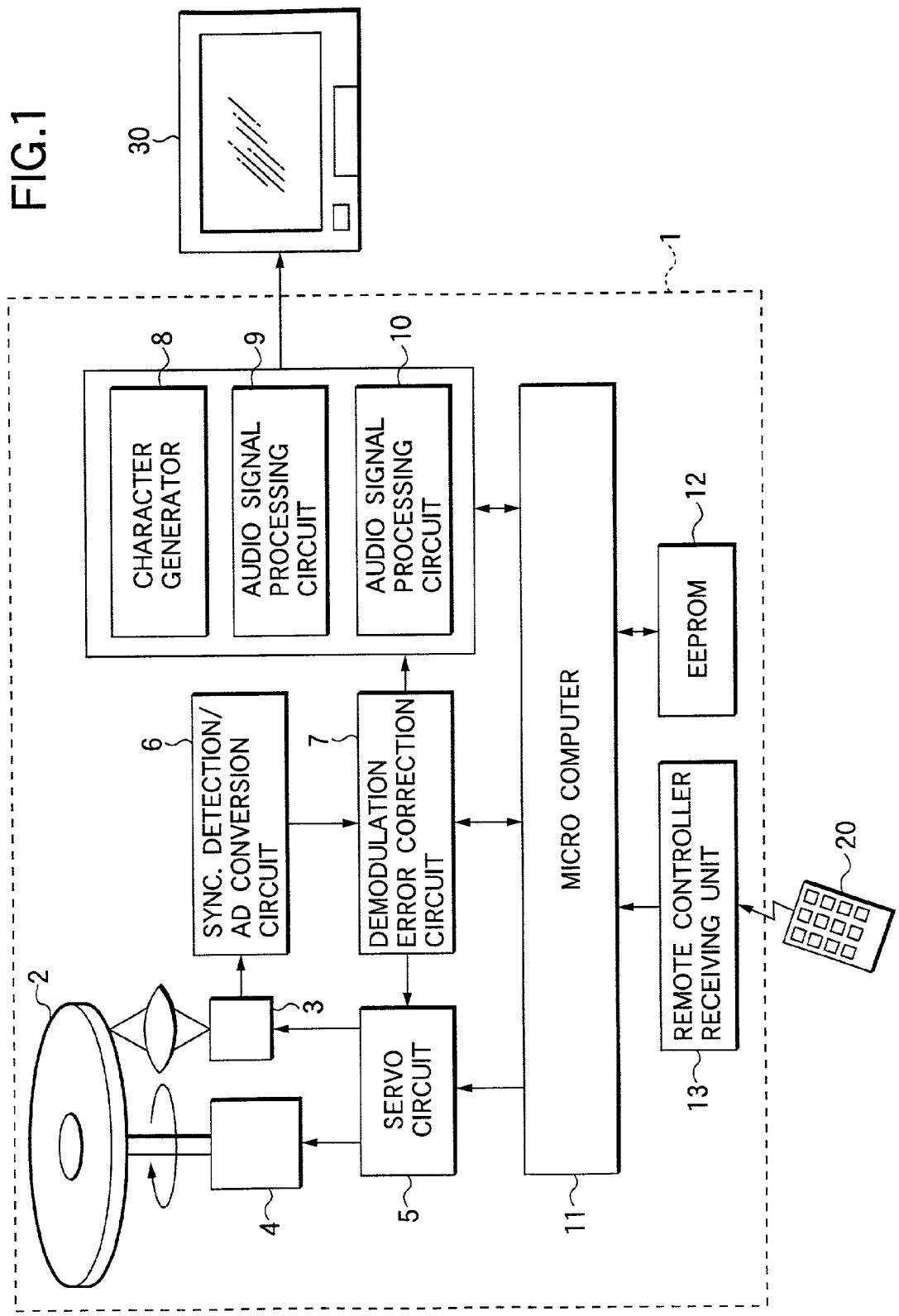
FIG. 1 is a block diagram of an optical disk reproducing device according to an embodiment of this invention.

Now referring to the drawings, a detailed explanation will be given of an embodiment of this invention.

Figure 2:
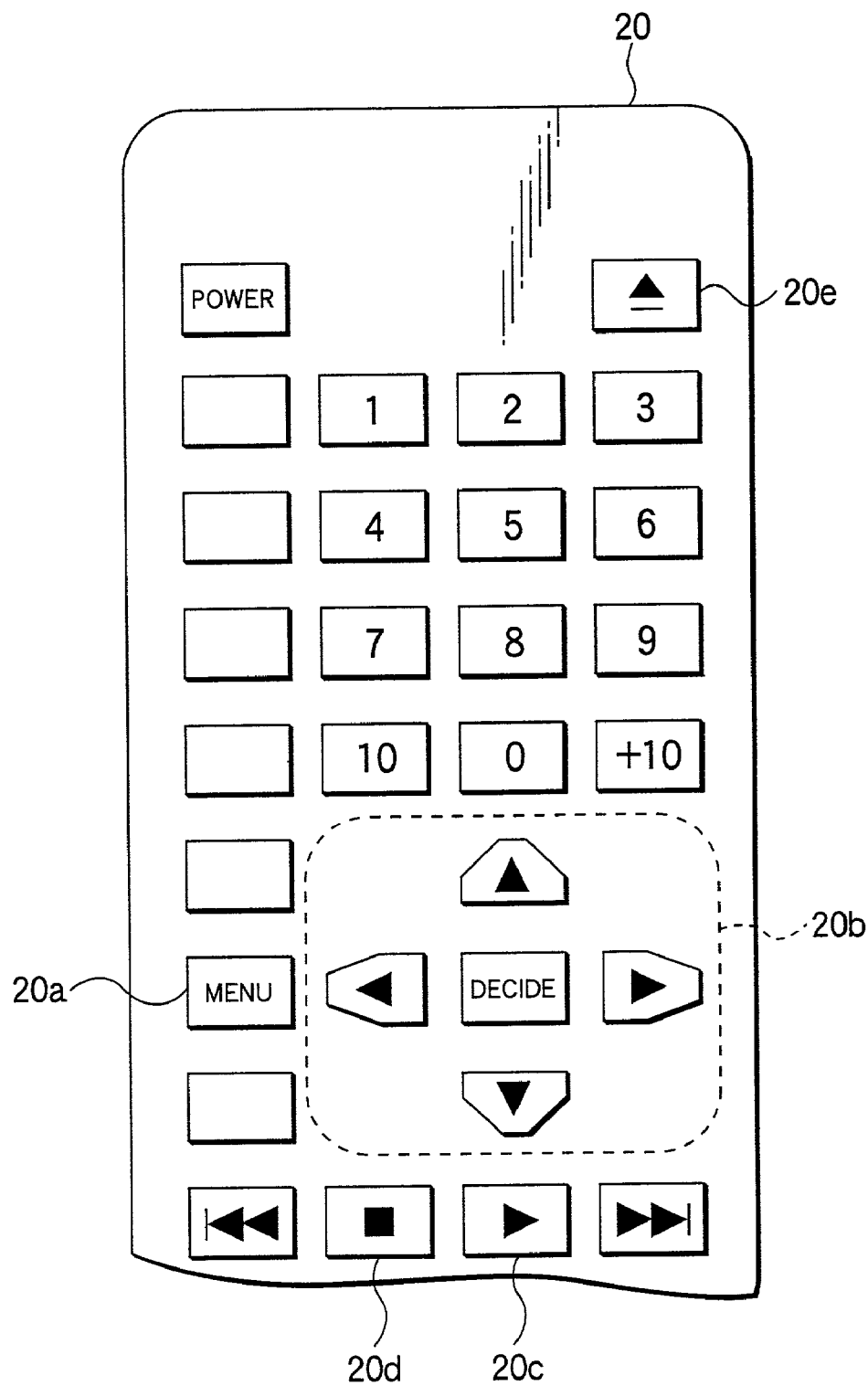
FIG. 2 is a view for explaining a remote controller for the optical disk reproducing device according to the embodiment of this invention.
Figure 3:
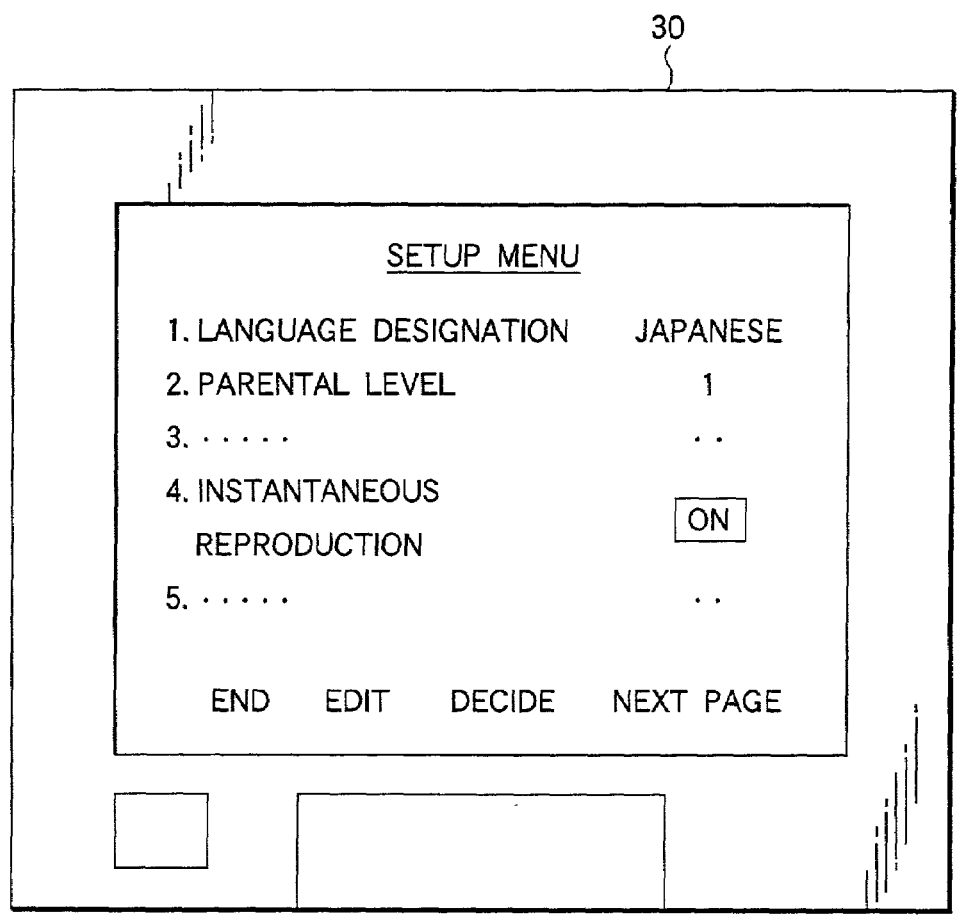
FIG. 3 is a view for explaining the setup menu of the optical disk reproducing device according to the embodiment of this invention.
Figure 4:
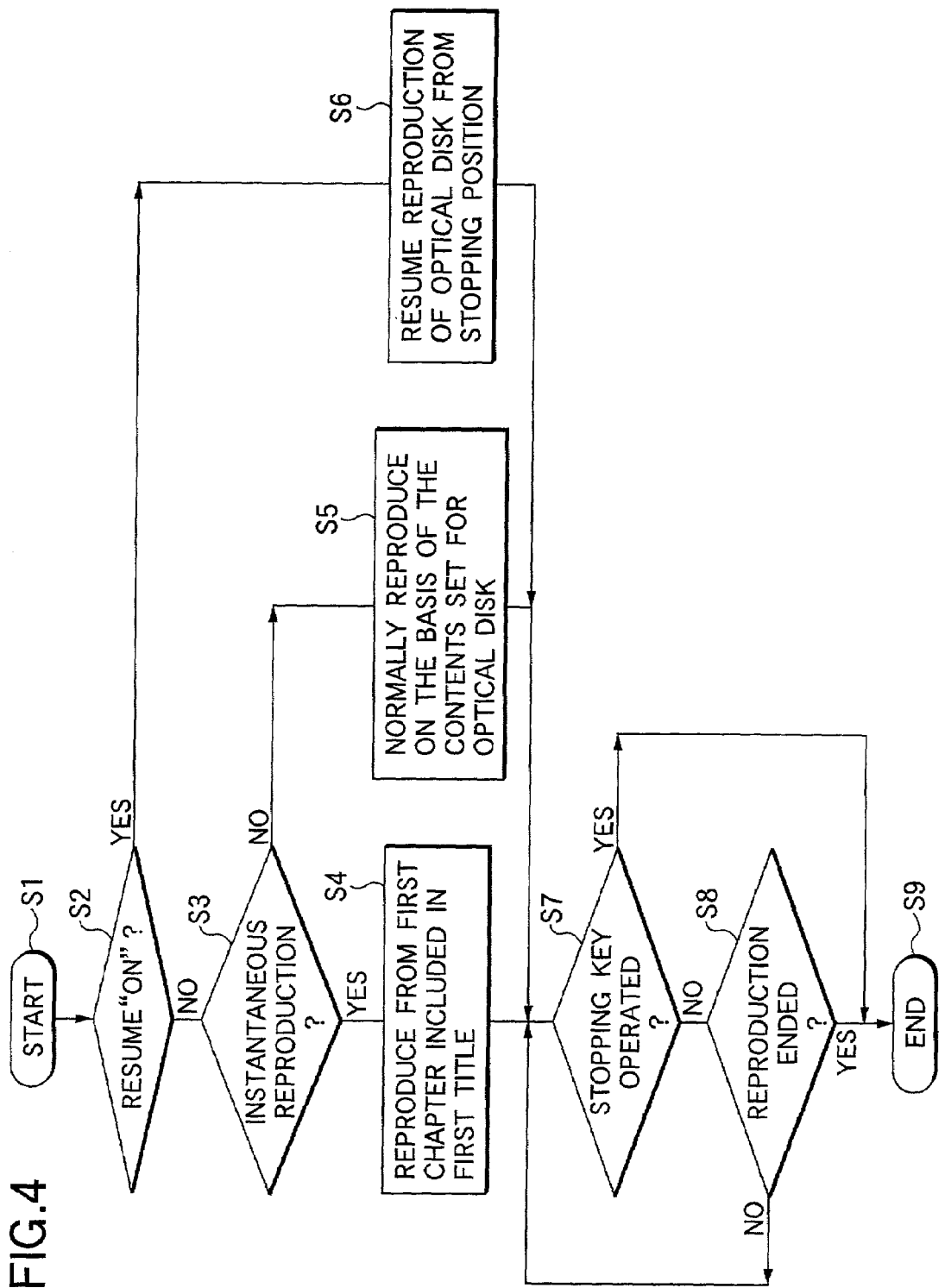
FIG. 4 is a flowchart showing the operation of the optical disk reproducing device according to the embodiment.

FIG. 1 is a block diagram of an optical disk reproducing device according to an embodiment of this invention. FIG. 2 is a view for explaining a remote controller for the optical disk reproducing device according to the embodiment of this invention. FIG. 3 is a view for explaining the setup menu of the optical disk reproducing device according to the embodiment of this invention. FIG. 4 is a flowchart showing the operation of the optical disk reproducing device according to the embodiment.

An explanation will be given of this invention with reference to FIG. 1 which is a block diagram of an optical disk reproducing device according to an embodiment of this invention, and referring to FIG. 2 which is a remote controller for the optical disk reproducing device according to the embodiment of this invention, and FIG. 3 which is a view for explaining the setup menu of the optical disk reproducing device according to the embodiment of this invention.

The video/audio signal recorded on an optical disk 2 such as a DVD is optically read by an optical pick-up of an optical disk reproducing device 1. A servo circuit 5 is a control circuit for performing the focus control and tracking control for the optical pick-up 3 and the CLV (Constant Linear Velocity) rotation control of a spindle motor 4 for rotating the optical disk 2.

The video/audio signal read by the optical pick-up 3 is supplied to a synchronous detection/AD (analog-digital) conversion circuit 6 so that the video/audio signal is amplified, synchronously detected on the basis of a reference clock, and converted from an along signal into a digital signal. The video/audio signal converted into the digital signal is supplied to a demodulation/error correcting circuit 7 so that it is demodulated and a data error of the video/audio signal read by the optical pick-up is corrected.

The video/audio signal error-corrected by the demodulating/error correcting circuit 7 is separated into a video signal and an audio signal which are in turn supplied to a video/audio signal processing circuit 9 and an audio signal processing circuit 10, respectively.

The video signal supplied to the video/audio signal processing circuit 9 is decoded by the video/audio signal processing circuit 9 and encoded into a video signal according to a prescribed signal system, e.g. NTSC (National Television System Committee) system so that the digital signal is converted into an analog signal which is supplied to a monitor circuit 30.

The audio signal supplied to the audio signal processing circuit 10 is decoded by the audio signal processing circuit 10 and thereafter converted from the digital signal into an analog signal which is in turn supplied to the monitor circuit 30.

Of the video/audio signal error-corrected by the demodulating/error correcting circuit 7, a control signal for controlling the system and the control signal and information signal reproduced by the video/audio signal processing circuit 9 and audio signal processing circuit 10 are supplied to a microcomputer 11 for controlling the entire system of the optical disk reproducing device 1.

The microcomputer 11 incorporates a ROM (Read-Only Memory) which stores a control program for controlling the system of the optical disk reproducing system 1 and a RAM (Random Access Memory) which temporarily stores processed data and others. The microcomputer 11 is connected to an EEPROM (Electrically Erasable and Programmable Read-Only Memory) which is a non-volatile memory which stores values for setting various functions of the optical disk reproducing device 1. The microcomputer 11 receives a command signal transmitted from a remote controller 20 via a remote controller receiving unit 13 and transmits a control signal to the servo circuit 5, video/audio signal processing circuit 9 and audio signal processing circuit 10 to control the entire system of the optical disk reproducing device 1.

As seen from FIG. 20, the remote controller 20 is provided with operation keys inclusive of a menu key 20*a* for displaying a setup menu for setting various functions of the optical disk device 1, a selecting key 20*b* for selecting a function from the setup menu, a reproducing key 20*c* for commanding that the optical disk 2 is reproduced, a stopping key 20*d* for commanding that reproduction, fast-forward, rewinding, etc. are stopped and a loading key 20*e* for commanding that the optical disk is loaded and unloaded. By operating these operating keys, the optical disk reproducing device 1 can execute a desired operation.

Although various functions of the optical disk device 1 are previously set, a user can change them in desired settings. Where settings of the various functions of the optical disk reproducing device 1 are changed, the user causes the setup menu to be displayed and selects various functions on the setup menu.

When the menu key 20*a* of the remote controller 20 is operated, the microcomputer 11 receives a command signal of displaying the setup menu from the remote controller 20 via the remote controller receiving unit 13, and controls a character generator 8 to display the setup menu on a screen of the monitor device 30 as shown in FIG. 3.

The user operates the selecting key 20*b* on the remote controller 20 to select, from the setup menu displayed on the screen of the monitor 30, language designation displaying the menu, a parental level which limits reproduction of the video/audio information with designations of adults, limited general users, general users, etc., instantaneous reproduction of reproducing the main video/audio information from the first chapter included in the first title without displaying the opening screen and the menu screen set for the optical disk, and the like. The settings of the selected various functions are stored in the EEPROM 12. The microcomputer 11 reads out the settings of the various functions stored in the EEPROM 12, and controls the optical disk device 1 on the basis of the settings of the read various functions.

The optical disk reproducing device 1 has a resume function that where the reproduction is stopped while the optical disk 2 is reproduced, when the reproducing key is pushed, the reproduction is resumed from the position which has been being reproduced. When the stopping key 20*d* of the remote controller 20 is pushed while the optical disk 2 is reproduced, the microcomputer 11 stores the stopping position of the optical pick-up 3 in the internal RAM and stops the reproduction of the optical disk 2. Where the optical disk 2 is not unloaded from the optical disk reproducing device 1, with the "resume" being ON, when the reproducing key 20*c* of the remote controller 20 is pushed, the stopping position stored in the internal RAM is read to resume the reproduction of the optical disk 2 from the stopping position. When the unloading key 20*e* of the remote controller 20 is operated, the optical disk 2 is unloaded from the optical disk reproducing device 1 so that the "resume" becomes OFF.

It is assumed that when the optical disk 2 is loaded in the optical disk device 1, the "resume" is OFF and "instantaneous reproduction" has been selected. In this state, when the reproducing key 20*c* of the remote controller 20 is operated, the optical disk 2 is reproduced from the first chapter included in the first title without the opening screen and menu screen set for the optical disk being displayed.

On the other hand, it is assumed that when the optical disk 2 is loaded in the optical disk device 1, "instantaneous reproduction" has not been selected. In this state, when the reproducing key 20*c* of the remote controller 20 is operated, the optical disk 2 is normally reproduced on the basis of the contents set for the optical disk 2 and the opening screen and menu screen set for the optical disk are also displayed. Thus, the user can operate the selecting key 20*b* of the remote controller 20 to select the desired title and chapter from the displayed menu. Therefore, the user can reproduce to enjoy the reproduced video/audio information belonging to the selected title and chapter.

Where the "instantaneous reproduction" has been selected, when the stopping key 20*d* of the remote controller 20 is operated while the optical disk 2 is reproduced, the microcomputer 11 stores the stopping position of the optical pick-up 3 in the internal RAM and stops the reproduction of the optical disk 2. When the reproduction of the optical disk 2 is stopped, the "resume" become ON. At this time, assuming that the unloading key 20*e* of the remote controller 20 is not operated and hence the optical disk 2 is not unloaded from the optical disk reproducing device 1, when the reproducing key 20c of the remote controller is operated, the microcomputer 11 can read the stopping position of the optical pickup 3 stored in the internal RAM and resume the reproduction of the optical disk 2 from the stopping position.

Incidentally, it should be noted that the various operation keys provided on the above remoter controller 20 may be provided on an operation panel (not shown) of the optical disk reproducing apparatus 1.

Now referring to the program shown in the flowchart of FIG. 4, an explanation will be given of the operation of the optical disk reproducing device according to this invention.

When the reproducing key of the remote controller which commands that the optical disk is reproduced is operated, the program proceeds from step S1 to step S2 to see whether the resume is ON or not. If the resume is not ON, the program proceeds to step S3. If the resume is ON, the program proceeds to step S6.

In step S3, it is decided whether or not the "instantaneous reproduction" has been selected. If the "instantaneous reproduction" has been selected, the program proceeds to step S4. If the "instantaneous reproduction" has been selected, the program proceeds to step S5.

In step S4, the main video/audio information is reproduced from the first chapter included in the first title recorded on the optical disk. The program proceeds to step S7.

In step S5, on the basis of the contents set for the optical disk, the opening screen and menu screen are displayed and the video/audio information recorded on the optical disk is normally reproduced. Thereafter, the program proceeds to step S7.

In step S6, the stopping position of the optical pickup stored in the internal RAM is read, and the reproduction of the optical disk is resumed from the stopping position. Thereafter, the program proceeds to step S7.

In step S7, it is decided whether or not the stopping key of the remote controller has been operated. If the stopping key of the remote controller has been operated, the program proceeds to step S9. If the stopping key of the remote controller has not been operated, the program proceeds to step S8.

In step S8, it is decided whether or not the reproduction of the video/audio information recorded on the optical disk has been ended. If the reproduction of the video/audio information recorded on the optical disk has been ended, the program proceeds to step S9. If the reproduction of the video/audio information recorded on the optical disk has not been ended, the program loops back to step S7. The microcomputer 11 repeats the steps from step S7 to step S8 to continue the reproduction of the optical disk.

The detailed expression has been given of the embodiment of this invention. However, this invention should not be limited to such an embodiment, but can be modified or improved within the knowledge of those skilled in the art.

As understood from the description hitherto made, in accordance with the optical disk reproducing device according to this invention, the setup menu for setting the various functions of the optical disk reproducing device is displayed, and a function is selected from the displayed setup menu. Assuming that the instantaneous reproduction has been selected, when the optical disk is loaded in the optical disk reproducing device to reproduce the video/audio information, without the opening screen and menu screen set for the optical disk being displayed, the video/audio information can be reproduced from the first chapter included in the first title of the video/audio information recorded on the optical disk. For this reason, when the optical disk is loaded in the optical disk reproducing device to reproduce the video/audio information recorded on the optical disk, the opening screen and the menu screen are not displayed. Thus, a user can instantaneously reproduce to enjoy main video/audio information without being irritated owing to retarded reproduction of the main audio/video information.

In an optical disk reproducing device according to this invention wherein a setup menu is displayed for setting various kinds of functions of the optical disk reproducing device and a function is selected from the displayed setup menu, assuming that "instantaneous reproduction" has been selected by the selecting means, when the optical disk is loaded in the optical disk reproducing device to reproduce the video/audio information, without an opening screen and a menu screen set for the optical disk being displayed, the video/audio information is reproduced from a first chapter included in a first title of the video/audio information recorded on the optical disk, and assuming that the "instantaneous reproduction" has not been selected by the selecting means, when the optical disk is loaded in the optical disk reproducing device for reproduction, the opening screen and the menu screen set for the optical disk are displayed and the video/audio information recorded on the optical disk is normally reproduced.

In an optical disk reproducing device according to this invention wherein a setup menu is displayed for setting various kinds of functions of the optical disk reproducing device and a function is selected from the displayed setup menu, assuming that "instantaneous reproduction" has been selected by the selecting means, when the optical disk is loaded in the optical disk reproducing device to reproduce the video/audio information, without an opening screen and a menu screen set for the optical disk being displayed, the video/audio information is reproduced from a first chapter included in a first title of the video/audio information recorded on the optical disk.

In an optical disk reproducing device according to this invention, assuming that the "instantaneous reproduction" has not been selected by the selecting means, when the optical disk is loaded in the optical disk reproducing device to reproduce the video/audio information, the opening screen and the menu screen set for the optical disk are displayed and the video/audio information recorded on the optical disk is normally reproduced.

In an optical disk reproducing device according to this invention, a function is selected from the setup menu by a selecting key provided on a remote controller or an operation panel.

What is claimed is:

1. An optical disk reproducing device for reproducing video/audio information recorded on an optical disk, comprising:
   a display means for displaying a setup menu for setting various kinds of functions of the optical disk reproducing device;
   a selecting means for selecting a function from the setup menu displayed by said display means; and
   a reproducing means for reproducing the video/audio information recorded on the optical disk on the basis of the function selected by said selecting means,
   wherein when an instantaneous reproduction has been selected by said selecting means, when the optical disk is loaded in said optical disk reproducing device to reproduce the video/audio information, without an opening screen and a menu screen set for said optical disk being displayed, the video/audio information is reproduced from a first chapter included in a first title of the video/audio information recorded on the optical disk, and wherein when that the instantaneous reproduction has not been selected by said selecting means, when the optical disk is loaded in said optical disk reproducing device to reproduce the video/audio information, the opening screen and the menu screen set for said optical disk are displayed and the video/audio information recorded on the optical disk is normally reproduced.

2. The optical disk reproducing device according to claim 1, wherein said selecting means is a selecting key provided on a remote controller or an operation panel.

3. An optical disk reproducing device for video/audio information recorded on an optical disk, comprising:
 a display means for displaying a setup menu for setting various kinds of functions of the optical disk reproducing device;
 a selecting means for selecting a function from the setup menu displayed by said display means; and
 a reproducing means for reproducing the video/audio information recorded on the optical disk on the basis of the function selected by said selecting means, wherein when an instantaneous reproduction has been selected by said selecting means, when the optical disk is loaded in said optical disk reproducing device to reproduce the video/audio information, without an opening screen and a menu screen set for said optical disk being displayed, the video/audio information is reproduced from a first chapter included in a first title of the video/audio information recorded on the optical disk.

4. The optical disk reproducing device according to claim 3, wherein assuming that the instantaneous reproduction has not been selected by said selecting means, when the optical disk is loaded in said optical disk reproducing device to reproduce the video/audio information, the opening screen and the menu screen set for said optical disk are displayed and the video/audio information recorded on the optical disk is normally reproduced.

5. The optical disk reproducing device according to claim 3, wherein said selecting means is a selecting key provided on a remote controller or an operation panel.

* * * * *